Oct. 25, 1927. 1,646,549
T. MADDEN
HARROW
Filed May 9, 1927
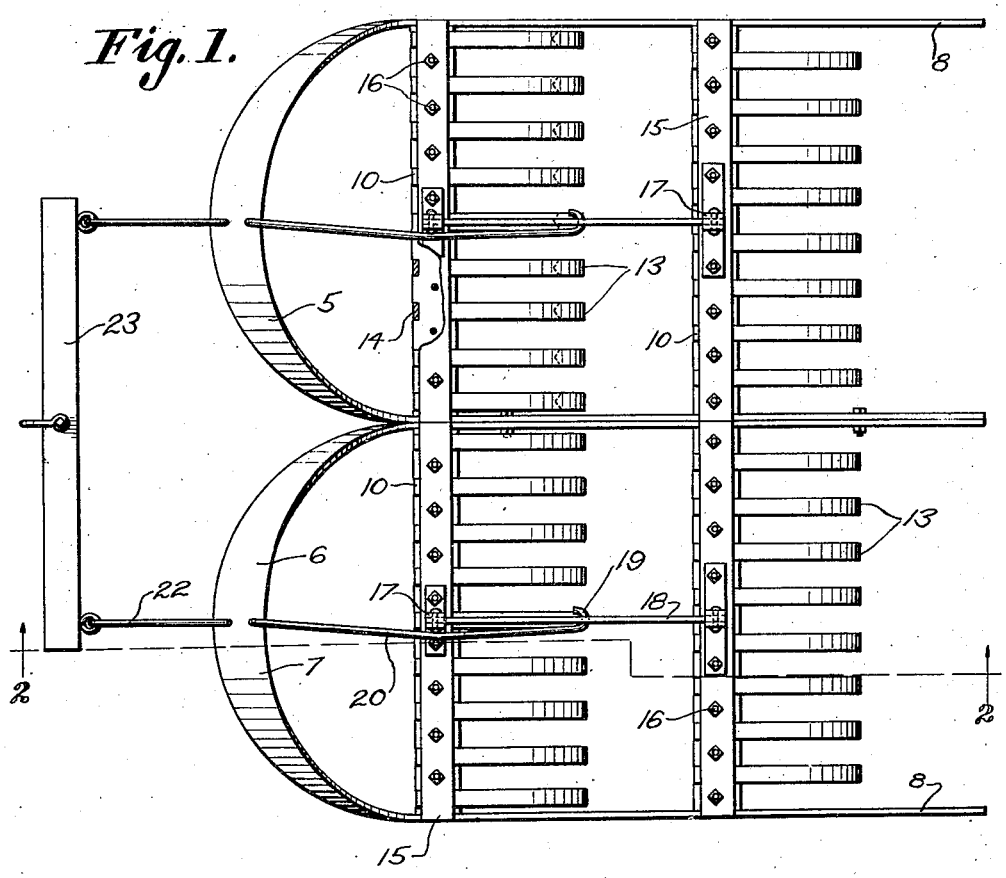
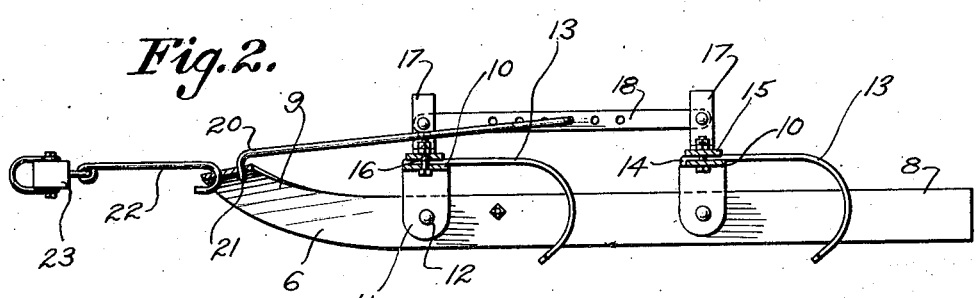
Timothy Madden Inventor Patented Oct. 25, 1927.

1,646,549

UNITED STATES PATENT OFFICE.

TIMOTHY MADDEN, OF EGG HARBOR, WISCONSIN.

HARROW.

Application filed May 9, 1927. Serial No. 190,003.

The present invention has reference to a smoothing harrow, and more particularly to a spring toothed harrow of novel design the primary object of the invention being to provide a harrow wherein the teeth are so constructed that they will thoroughly harrow and level the soil, leaving the soil free of ruts or deep grooves.

Another object of the invention is to provide a harrow, the frame thereof being so constructed that the forward end will ride over clods or other obstructions, to the end that the harrow may be operated in a direct line.

A still further object of the invention is to provide two supporting bars arranged in pairs and pivotally supported by each section of the frame, means being provided for adjusting the bars and holding the bars in various positions of adjustment.

Another object of the invention is to provide teeth so constructed that they will be securely held to the two supporting bars, eliminating any possibility of the teeth moving with respect to their supporting bars.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a sectional harrow, constructed in accordance with the invention.

Figure 2 is a sectional view taken on line 2—2 of Figure 1.

Referring to the drawing in detail, the harrow embodies lateral sections 5 and 6 respectively, each of which sections embodies a bar bent intermediate its ends to provide a forward curved portion 7 and rearwardly extended parallel sides 8.

As shown, the forward end of each section extends slightly upwardly as at 9 so that the harrow will ride over clods, stones or other obstructions which may be in the path of travel of the harrow.

The reference character 10 designates the teeth supporting bars of the harrow, and as shown each of these bars is provided with downwardly extended end portions 11 formed with openings to receive the bolts 12 that pivotally connect the bars 10 to the sides of the harrow.

As shown, these bars are provided with cut out portions formed along the forward edges thereof, the cut out portions being arranged in predetermined spaced relation with each other, the number of cut out portions to the bar, being determined by the number of teeth to be supported by the bars.

The teeth are indicated by the reference character 13 and are of the spring type, each tooth being provided with a downwardly extended end portion 14 to be fitted in the cut out portion adjacent thereto to lock the teeth against lateral movement while the same are passing over the ground surface.

Cooperating with the bars 10 of each harrow section, are securing strips 15, which overlie the teeth, as shown by Figure 2, the securing strips being held in position over the harrow teeth and bars 10, by means of the bolts 16.

Extending upwardly from each tooth supporting bar and disposed intermediate the ends thereof, are arms 17 between which the connecting bars 18 are pivotally mounted, the bars 18 being provided with spaced openings to receive the hooks 19 of the rods 20 that have right angled downwardly extended forward end portions 21 adapted to be fitted in openings at the forward ends of the harrow sections.

Thus it will be seen that due to this construction, the rods 20 may be operated to swing the tooth supporting bars and adjust the teeth with respect to the ground surface over which the harrow is moving, thereby adapting the device for use in harrowing soil under various conditions.

Rods 22 connect with the sections of the harrow and have connection with the bar 23 to which a suitable draught appliance may be connected.

I claim:

A harrow embodying lateral sections, each section including side members, tooth supporting bars pivotally connected with the side members, teeth mounted on the tooth supporting bars, connecting bars connecting the tooth supporting bars, said connecting bars having a plurality of spaced openings, a rod associated with each connecting bar and having a hook at one end to be positioned in an opening to secure the rod to the bar, and said rod having a right angled end to be positioned in an opening of the harrow to lock the tooth supporting bars in their positions of adjustment.

In testimony that I claim the foregoing as my own, I have hereto affixed my signature.

TIMOTHY MADDEN.